United States Patent
Rijns

Patent Number: 5,832,039
Date of Patent: Nov. 3, 1998

[54] DATA PROCESSING CIRCUIT

[75] Inventor: Johannes J. F. Rijns, Eindhoven, Netherlands

[73] Assignee: U. S. Philips Corporation, New York, N.Y.

[21] Appl. No.: 433,180

[22] Filed: May 3, 1995

Related U.S. Application Data

[63] Continuation of Ser. No. 141,915, Oct. 22, 1993, abandoned.

[30] Foreign Application Priority Data

Oct. 22, 1992 [EP] European Pat. Off. ............... 92203253

[51] Int. Cl.$^6$ .............................. H04L 25/06; H04L 25/10
[52] U.S. Cl. .............................. 375/317; 375/355; 327/91
[58] Field of Search .................................... 375/317, 354, 375/355; 327/91, 93, 94, 97

[56] References Cited

U.S. PATENT DOCUMENTS

| | | | |
|---|---|---|---|
| 4,001,604 | 1/1977 | Parks et al. | 307/353 |
| 4,115,811 | 9/1978 | Goff | 358/167 |
| 4,751,468 | 6/1988 | Agoston | 327/353 X |
| 4,873,700 | 10/1989 | Wong | 375/76 |
| 5,124,576 | 6/1992 | Jensen | 307/353 |

OTHER PUBLICATIONS

"Teletext and Viewdata" Steve A. Money, pp. 19–34.

*Primary Examiner*—Tesfaldet Bocure
*Assistant Examiner*—Bryan Webster
*Attorney, Agent, or Firm*—Michael E. Marion

[57] ABSTRACT

To enable a serial data signal to be sampled reliably through a longer time period, the data signal is applied to a data slicer with a dynamically variable slice level. The slice level is dynamically adjusted in dependence upon a feedback of the sliced signal. A track-and-hold circuit, with control feedback from a low pass filter and peak detectors, provides for a design which is tolerant of timing variations. Also disclosed are circuits for reducing the effects of cochannel and other interferences.

11 Claims, 4 Drawing Sheets

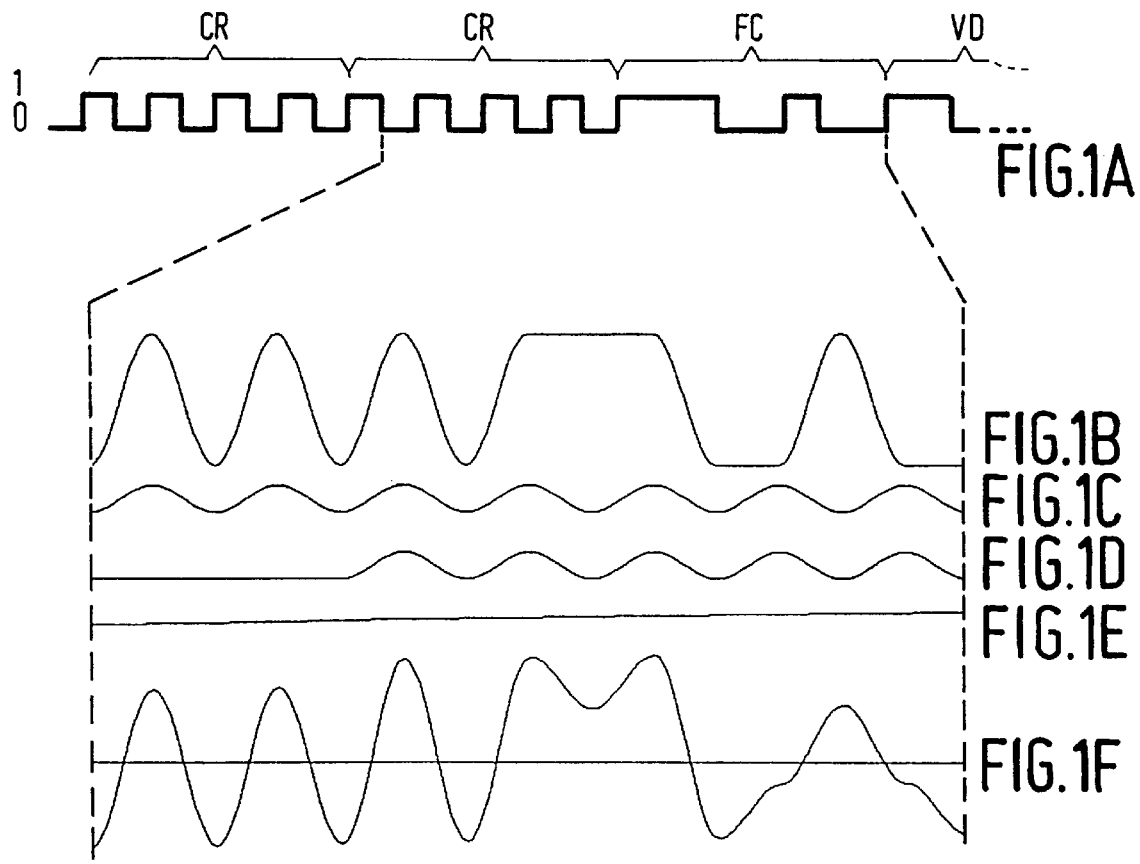
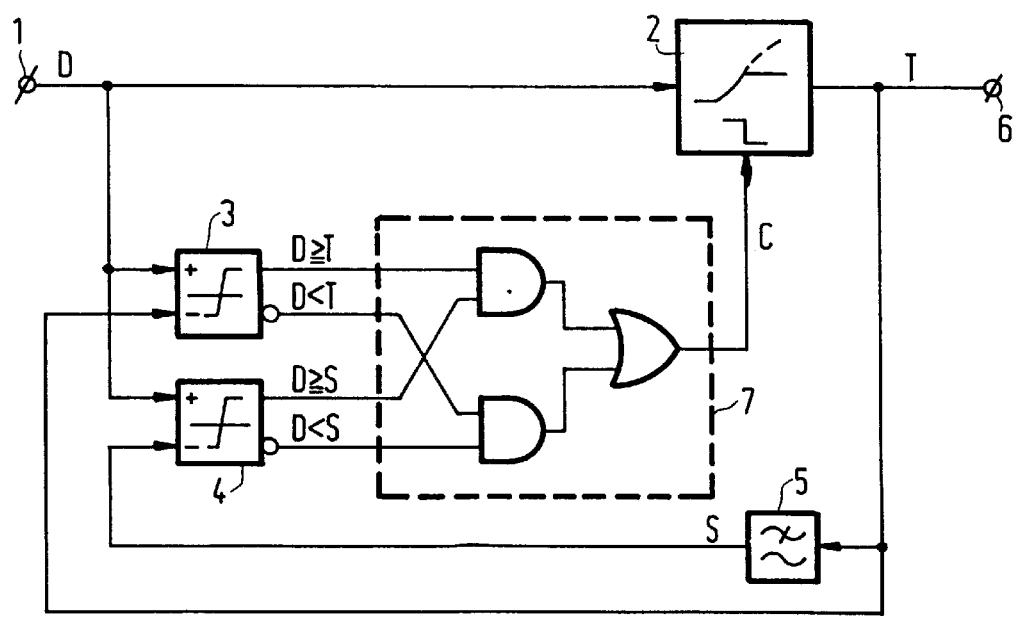

DATA PROCESSING CIRCUIT

This is a continuation of application Ser. No. 08/141,915, filed Oct. 22, 1993 now abandoned.

FIELD OF THE INVENTION

This invention relates to a data processing circuit for processing a serial data signal. A serial data signal is herein understood to mean a signal which represents the bit values of a transmitted bit stream at discrete sampling instants. More particularly, the invention relates to a data processing circuit for processing a teletext data signal, in which the bit stream is transmitted in picture lines of a television signal. The invention also relates to a device for measuring the amplitude of the data signal.

BACKGROUND OF THE INVENTION

Demodulation of a data signal for obtaining the transmitted bit stream comprises two operations. In a first operation, referred to as clock regeneration, a sampling frequency is regenerated from the data signal, which frequency corresponds to the clock frequency of the bit stream. In a second operation, referred to as data slicing, the data signal is compared with a slice level. The bit stream is regained by checking whether the data signal at the sampling instants is larger or smaller than the slice level.

For a reliable demodulation of the bit stream a certain eye opening (height and width) of the data signal is required. The eye height is the worst case distance between the positive and negative sampling values of the data signal with respect to the nominal data amplitude. The eye width, also referred to as decoding margin, determines the allowed tolerances at the sampling instants of the clock regenerator. At the transmitter end the eye height is approximately 100% and the eye width is substantially equal to the bit period. However, during the transmission the data signal is affected by external disturbances. For example, a television signal, and hence the teletext data signal incorporated therein, is subject to, inter alia, reflections (echoes) and interference of adjacent television channels (cochannel). Echoes cause local minima and maxima in the data signal, while cochannel becomes manifest as a slow variation of the DC level. Such disturbances reduce the eye opening and hence the reliability of the bit stream demodulation.

SUMMARY OF THE INVENTION

It is an object of the invention to provide a data processing circuit with which the reliability of the bit stream demodulation is enhanced.

According to the invention, the data processing circuit comprises a track-and-hold circuit to which the data signal and a control signal are applied. The output signal of such a track-and-hold circuit tracks the applied data signal at a first value of the control signal and holds the data signal at a second value of the control signal. The data processing circuit further comprises first detection means for detecting the occurrence of peak values of the data signal, means for generating a provisional slice level and second detection means for detecting whether the data signal intersects the provisional slice level. A control circuit coupled to the detection means generates the first value of the control signal if the data signal intersects the provisional slice level, and generates the second value if a peak value of the data signal occurs.

Thus, the data processing circuit supplies an output signal which alternately holds the positive and negative peak values of the data signal for some time. As it were, the output signal is a replica of the data signal, though with a larger eye width and largely deprived of local minima. Consequently, the output signal has a larger eye opening than the data signal. This signal can be applied to a conventional data slicer and has a smaller error probability.

The provisional slice level determines the instants when the data processing circuit changes over from positive to negative tracking, and conversely. No stringent requirements are imposed on the accuracy of this provisional slice level. Consequently, this level can be obtained in a simple manner, for example, by low-pass filtering of the data signal or the output signal.

A further embodiment of the data processing circuit comprises a first sample-and-hold circuit for sampling positive peak values and a second sample-and-hold circuit for sampling negative peak values. The data processing circuit thereby acquires the function of an envelope detector which provides both the positive and the negative envelope of the data signal. If the data signal is disturbed by cochannel interference, the cochannel component in both envelopes is present to the same extent. By averaging both envelopes, a data slice level is obtained which tracks the cochannel interference and is optimally located in the centre of the eye.

It is to be noted that the book "Teletext and Viewdata" by Steve A. Money, pp. 19–34, describes an adaptive data slicer for teletext data signals. In this data slicer the data signal is applied to a positive peak detector and to a black level detector. The slice level is derived from the output signals thereof. However, the black level detector does not track the variations of the negative sampling values. Consequently, the slice level is not optimally adapted to the perturbations which are present in the data signal. Moreover, the known data slicer has the drawback that two separate circuits are used for obtaining the two envelopes.

If the two envelopes are subtracted from each other, a difference signal which is free from cochannel is obtained and which can be applied to a further envelope detector. It has been found that the positive envelope of the difference signal corresponds to the original data amplitude plus echo amplitude and that the negative envelope of the difference signal corresponds to the original data amplitude minus echo amplitude. Averaging of the two envelopes thus yields the amplitude of the data signal. A slice level which is free from echo is obtained by adding this amplitude to the negative envelope or by subtracting it from the positive envelope.

BRIEF DESCRIPTION OF THE DRAWINGS

FIGS. 1A, 1B, 1C, 1D, 1E and 1F show some signal waveforms to explain the structure of a serial data signal.

FIG. 2 shows a data processing circuit according to the invention;

DETAILED DESCRIPTION OF THE PREFERRED EMBODIMENTS

Figure 3:
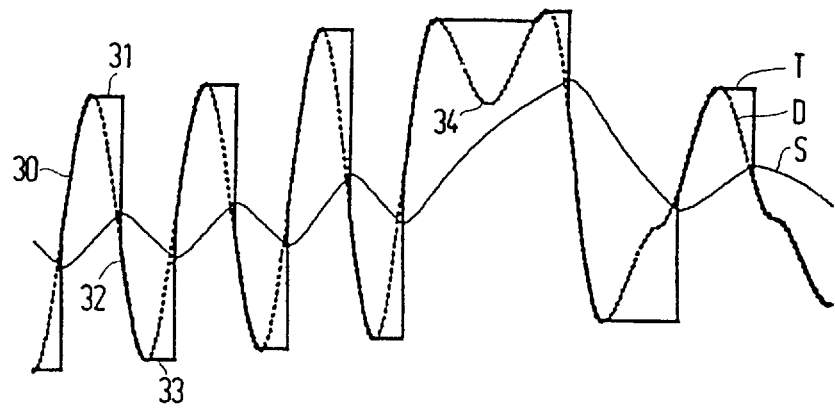
FIG. 3 shows some signal waveforms to explain the data processing circuit of FIG. 2.

FIG. 1A shows a serial teletext bit stream transmitted in a picture line of a television signal during the vertical field retrace. The bit stream comprises two clock-run-in bytes CR forming a pattern of alternating zeros and ones, a framing code byte FC with a predetermined fixed bit pattern and variable data VD. The bit rate is approximately 7 Mbit/sec. For a portion of the bit stream, FIG. 1B shows the signal waveform of the corresponding teletext data signal transmitted by the television transmitter.

During transmission the data signal is subject to echoes and cochannel. To illustrate this, FIG. 1C shows a negative echo of the data signal with a delay of 7 T (T is the bit period). In a corresponding manner, FIG. 1D shows a positive echo with a delay of 14 T. The combination of these two echoes is known in the teletext literature by the abbreviation DELPHI (Defined Eye Loss with Precision Held Indication) and is generally used as a standard interference of a teletext data signal for measurements of data slicers. FIG. 1E further shows cochannel interference in the form of a low-frequency sine with a small amplitude.

Due to the interference thus introduced, the teletext data signal has acquired the shape at the receiver end, which shape is shown in FIG. 1F. The echoes cause local minima and maxima in the data signal and the cochannel becomes manifest as a slow variation of the DC level.

FIG. 2 shows an embodiment of a data processing circuit according to the invention. The data signal D received at an input 1 is applied to a track-and-hold circuit 2, to a positive input of a first comparator 3 and to a positive input of a second comparator 4. The track-and-hold circuit 2 further receives a control signal C and supplies an output signal T. The output signal T is applied to a negative input of the first comparator 3, to a low-pass filter 5 and to an output 6 of the circuit. The output of the low-pass filter 5 supplies a provisional slice level S which is applied to the negative input of the second comparator 4. The first comparator 3 compares the data signal with the output signal T and activates a respective output $D \geq T$ or $D<T$. The second comparator 4 compares the data signal D with the provisional slice level S and activates a respective output $D \geq S$ or $D<S$. Said outputs are coupled to a control circuit 7 which generates the control signal C for the track-and-hold circuit 2. The control circuit 7 shown in FIG. 2 supplies C="1" if $D \geq T$ and $D \geq S$ or if $D<T$ and $D<S$. Other input combinations lead to C="0".

The track-and-hold circuit 2 is generally known. The circuit tracks the input signal (track mode) when the control signal C has the logic value "1" and maintains the output signal constant (hold mode) when the control signal C has the logic value "0".

To explain the data processing circuit, FIG. 3 shows the signal waveforms of the data signal D, the provisional slice level S and the output signal T. The signal waveform shown in FIG. 1F has been taken as the data signal D. As long as the data signal D is larger than or equal to the output signal ($D \geq T$) and is also larger than the provisional slice level ($D \geq S$), C="1". The output signal then tracks the data signal. This is denoted by the reference numeral 30 in the Figure. After the data signal has reached a local peak value, D will become $<T$. The control circuit now supplies C="0" so that the track-and-hold circuit assumes the hold mode. The output signal now remains constant and the local peak value is held. This is denoted by the reference numeral 31 in the Figure. The hold mode is maintained until the data signal intersects the provisional slice level and D becomes $<S$. Consequently, C becomes "1" and the track-and-hold circuit resumes the track mode in which the output signal tracks the data signal. This is denoted by the reference numeral 32 in the Figure. After a negative peak value has been reached, the hold mode follows again in which the output signal remains constant and now the negative peak value is held. This is denoted by the reference numeral 33 in the Figure.

As is apparent from FIG. 3, the data processing circuit produces, as it were, a replica of the data signal, though with a larger eye opening. The time margin in which the output signal can be sampled is considerably larger than the corresponding margin at the original data signal. Consequently, less stringent requirements are imposed on the precision (jitter) of a clock regenerator to which the output signal is applied. Moreover, the data signal has been deprived of local minima to a considerable extent. For example, the local minimum denoted by the reference numeral 34 in FIG. 3 is no longer present in the output signal. Consequently, a data slicer to which this output signal is applied produces fewer errors.

Figure 4:
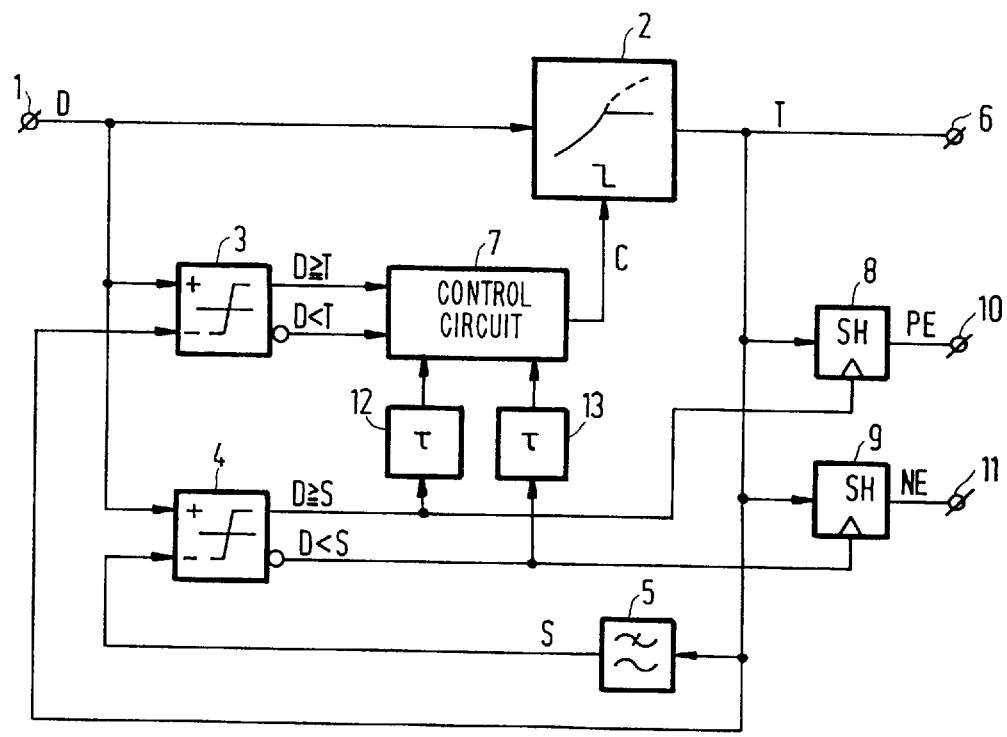
FIG. 4 shows a further embodiment of the data processing circuit according to the invention.

FIG. 4 shows a further embodiment of the data processing circuit. In this Figure elements denoted by the same reference numerals have the same function as in FIG. 2. The data processing circuit now further comprises two sample-and-hold circuits 8 and 9 having outputs 10 and 11, respectively. The inputs of both sample-and-hold circuits receive the output signal T from the track-and-hold circuit 2. The signals $D \geq S$ and $D<S$ are applied as clock signals for the sample-and-hold circuits. The sampling instant is determined by the negative edges of the clock signal.

Figure 5:
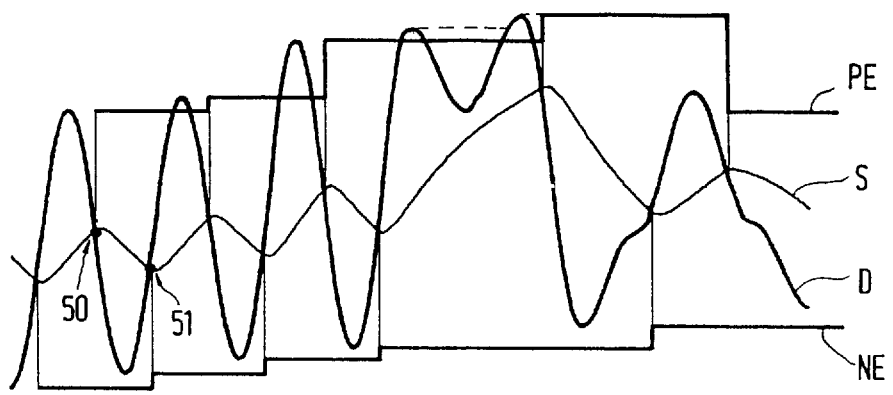
FIG. 5 shows some signal waveforms to explain the data processing circuit of FIG. 4.

FIG. 5 shows some signal waveforms to explain the data processing circuit shown in FIG. 4. At the instant denoted by the reference numeral 50 the data signal D intersects the provisional slice level S so that a negative edge is produced at the output $D \geq S$ of comparator 4. Consequently, sample-and-hold circuit 8 is clocked and the output signal T is sampled. At this sampling instant the output signal T still has the positive peak value of the data signal D. At the instant denoted by the reference numeral 51 the data signal D again intersects the provisional slice level S. Now, the negative edge is produced at the output $D<S$ of comparator 4 and the second sample-and-hold circuit 9 is clocked. This circuit then samples the negative peak value of the data signal. In this way a positive envelope PE is obtained at the output 10 of sample-and-hold circuit 8. In a corresponding manner, a negative envelope NE is obtained at output 11 of sample-and-hold circuit 9. To ensure that the peak value is sampled before the track-and-hold circuit changes its mode, a short delay τ may be introduced between the outputs of comparator 4 and the control circuit 7. This delay is denoted by the reference numerals 12 and 13, respectively, in FIG. 4.

Figure 6:
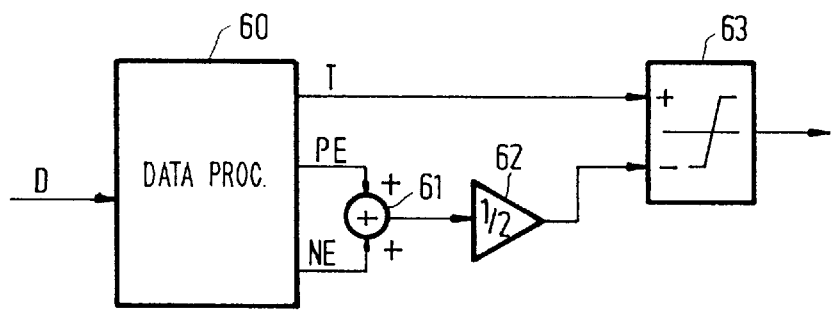
FIG. 6 shows a data slicer comprising the data processing circuit of FIG. 4.

FIG. 6 shows a data slicer. This slicer comprises a data processing circuit 60, an adder 61, a multiplier 62 and a comparator 63. The data processing circuit 60 is constituted by the circuit shown in FIG. 4. The circuit receives the data signal D and supplies the output signal T as well as the positive envelope PE and the negative envelope NE of the data signal. Both envelopes PE and NE are added in the adder 61. The sum signal is halved by the multiplier 62. Consequently, the multiplier supplies the comparator 63 with a slice level which is located halfway between the two envelopes. If the data signal is disturbed by cochannel interference, the two envelopes comprise the same cochannel component. The slice level supplied by multiplier 62 tracks this cochannel interference and is thus always optimally located in the centre of the eye opening.

Figure 7:
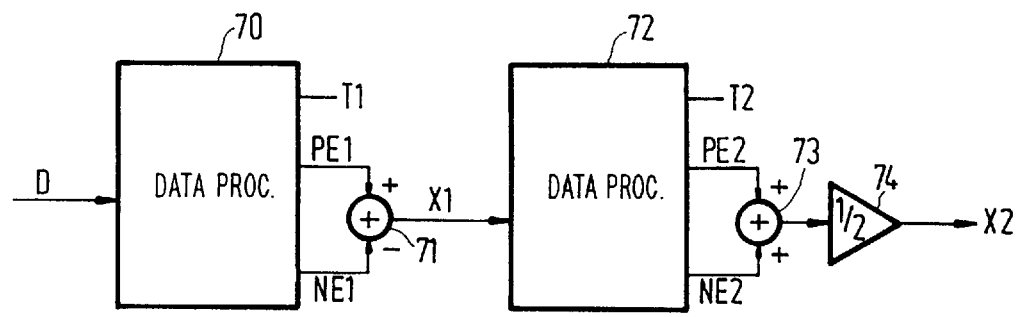
FIG. 7 shows a device for measuring the amplitude of a data signal.

FIG. 7 shows a device for measuring the amplitude of a data signal. The device comprises a first data processing circuit 70 and a second data processing circuit 72. Both data processing circuits are constituted by the circuit shown in FIG. 4. The data signal is applied to the first data processing circuit. The positive and negative envelopes of this data signal, now referred to as PE1 and NE1, respectively, are subtracted from each other in a subtracter circuit 71. The difference signal X1 obtained therefrom is applied to the data signal input of the second data processing circuit 72. The second data processing circuit now constitutes the positive and negative envelopes PE2 and NE2, respectively, of the difference signal in the manner already described. These envelopes are summed by an adder 73 and halved by a multiplier 74. The output signal X2 thus obtained represents the mean value of the envelopes PE2 and NE2.

Figure 8A:
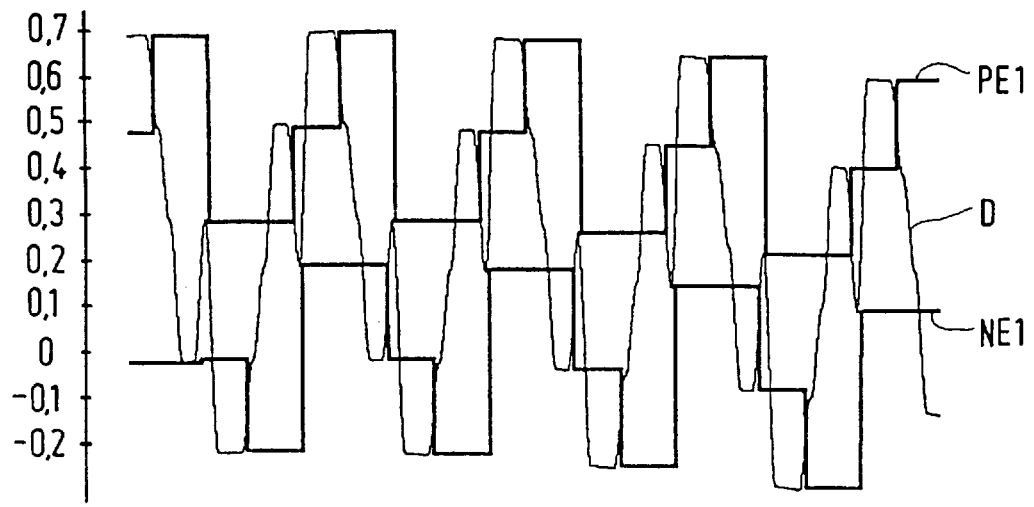
FIGS. 8A, 8B show some signal waveforms to explain the device of FIG. 7.
Figure 8B:
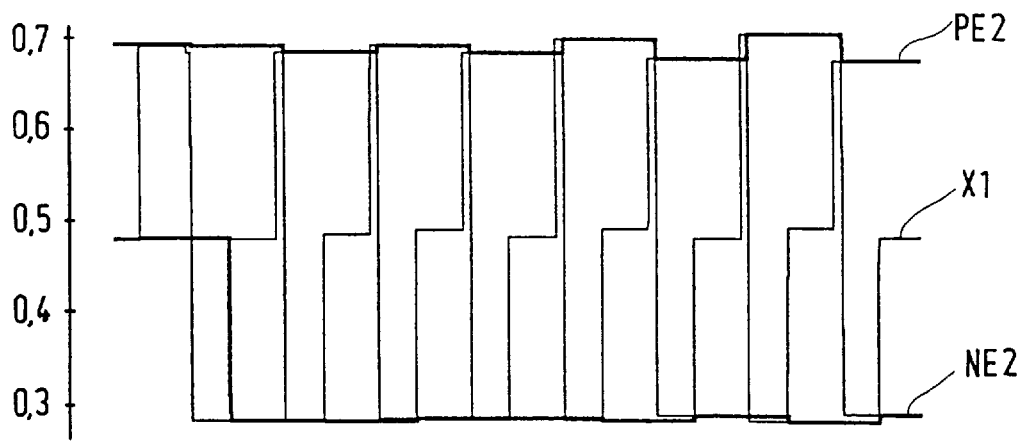

FIG. 8 shows some signal waveforms to explain the device of FIG. 7. The data signal applied to the device is assumed to represent a bit stream comprising a repetition of the framing code 11100100 and its inverse 00011011. The data signal comprises cochannel and echo components. This is denoted by D in FIG. 8A. FIG. 8A further shows the two envelopes PE1 and NE1. As already stated hereinbefore and as apparent from the Figure, the two envelopes have the same DC variations due to the cochannel interference. The difference signal X1=PE1−NE1, shown in FIG. 8B, is thus free from cochannel. This signal is applied to the second data processing circuit 72 (see FIG. 7) which generates the positive and negative envelopes of the difference signal. These two envelopes are denoted by PE2 and NE2, respectively in FIG. 8B. It has been found that the positive envelope PE2 is representative of the data amplitude plus the echo amplitude and that the negative envelope NE2 is representative of the data amplitude minus the echo amplitude. To illustrate this, the signals in FIG. 8 have been given concrete scale values. The original (undisturbed) data signal has an amplitude of 0.5 $V_{pp}$ and the echo amplitude is 0.2 $V_{pp}$ (40% echo). It is apparent from FIG. 8B that PE2=0.7 V and NE2=0.3 V. The mean value thereof (0.5 V) corresponds to the original data amplitude.

The device for measuring the data amplitude may be used in different ways. For example, half the amplitude may be added to the black level of a television signal in order to obtain an optimum slice level, even at a large echo amplitude. The device may also be incorporated in the control system of a controllable amplifier for obtaining a data signal of constant amplitude.

What is claimed is:

1. A data processing circuit for processing a serial data signal received at a circuit input, comprising:

track and hold means responsive to a control signal and to said serial data signal for generating at its output an output signal which tracks said serial data signal upon receipt of a first value of said control signal and for holding said serial data signal upon receipt of a second value of said control signal;

first detection means coupled to said circuit input and said output of said track and hold means and having output means for outputting a first predetermined value when said serial data signal is substantially greater than said output of said track and hold means and for outputting a second predetermined value when said serial data signal is substantially less than said output of said track and hold means;

slice generating means for generating a slice level of said track and hold means upon receipt of said output signal;

second detection means coupled to said circuit input and said slice generating means and having output means for outputting a third predetermined value when said serial data signal is substantially greater than said slice level signal and a fourth predetermined value when said serial data signal is substantially less than said slice level signal; and control means coupled to said output means of the first detection means and said second detection means for generating said control signal when said serial data signal is less than said output signal and said slice level signal or greater than said output of said track and hold means and said slice level signal.

2. The data processing circuit of claim 1, wherein said first detection means includes a comparator which compares said serial data signal and said output signal.

3. The data processing circuit of claim 1, wherein the slice generating means includes a low-pass filter.

4. The data processing circuit of claim 1, further including first output sample and hold means responsive to said second detection means and to said output signal for generating a positive envelope for said serial data signal.

5. The data processing circuit of claim 4, further including second sample and hold means responsive to said second detection means and to said output signal for generating a negative envelope for said serial data signal.

6. The data processing circuit of claim 5, further including output slice generating means coupled to said first sample and hold circuit and said second sample and hold circuit for outputting an average of said positive envelope and said negative envelope.

7. The data processing circuit of claim 2 wherein said second detection means comprises a second comparator which compares said serial data signal and said slice level signal.

8. The data processing circuit of claim 7 wherein the slice generating means comprises a low pass filter coupled between the output of the track and hold means and an input of the second comparator.

9. A data processing circuit for processing a serial data signal received at a circuit input, comprising:

track and hold means responsive to a control signal and to said serial data signal for generating at its output an output signal which tracks said serial data signal upon receipt of a first value of said control signal and for holding said serial data signal upon receipt of a second value of said control signal, first detection means coupled to said circuit input for detecting the occurrence of peak values of the serial data signal, means coupled to said output of the track and hold means for deriving a provisional slice level signal, second detection means coupled to said circuit input for detecting whether the serial data signal intersects the provisional slice level signal, and control means coupled to an output of the first detection means and to an output of the second detection means for generating the first value of the control signal if the data signal intersects the provisional slice level signal and for generating the second value when a peak value of the serial data signal occurs.

10. The data processing circuit of claim 9 further comprising:

a first sample and hold circuit coupled to the output of the track and hold means and to a first output of the second detection means for sampling the output signal at the occurrence of positive peak values thereof so as to obtain a positive envelope for said serial data signal, and a second sample and hold circuit coupled to the output of the track and hold means and to a second output of the second detection means for sampling the output signal at the occurrence of negative peak values thereof so as to obtain a negative envelope for said serial data signal.

11. The data processing circuit of claim 10 further comprising:

means coupled to respective outputs of the first and second sample and hold circuits for averaging the positive and negative envelopes so as to derive a further slice level signal.

* * * * *